UNITED STATES PATENT OFFICE.

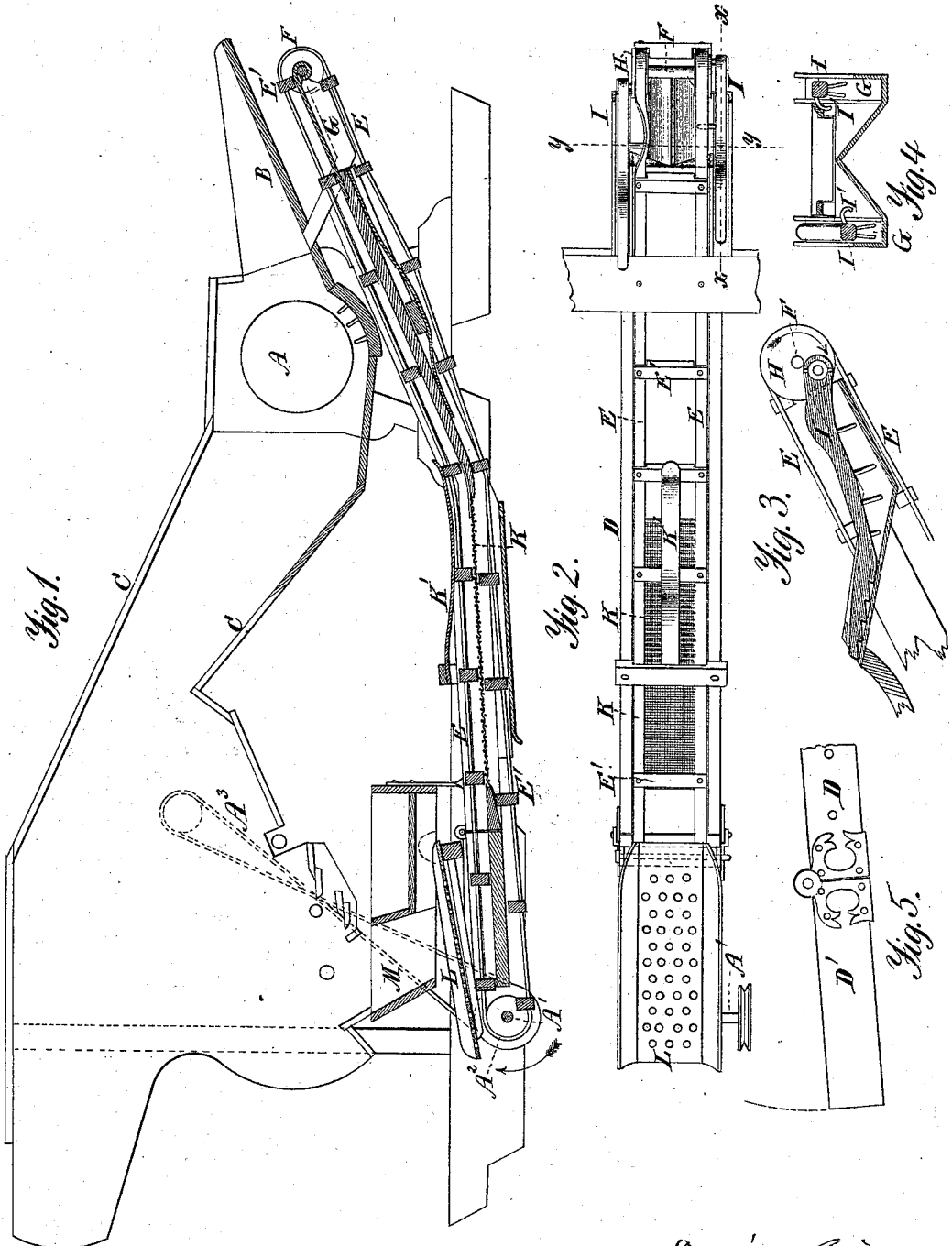
D. GEISER.
Separators for Thrashing-Machines.
No. 149,741. Patented April 14, 1874.

DANIEL GEISER, OF WAYNESBOROUGH, PENNSYLVANIA.

IMPROVEMENT IN SEPARATORS FOR THRASHING-MACHINES.

Specification forming part of Letters Patent No. 149,741, dated April 14, 1874; application filed January 3, 1874.

*To all whom it may concern:*

Be it known that I, DANIEL GEISER, of Waynesborough, in the county of Franklin and State of Pennsylvania, have invented a certain Improvement in Separators for Thrashing-Machines, of which the following is a specification:

This invention relates to a device which is designed to be attached to a thrashing-machine, for the purpose of effecting a portion of the separation of the grain from dust, chaff, and other foreign substances necessary to be made in such machines, and for the purpose of returning to the thrashing-cylinder thereof what are termed "tailings," or such parts as require to be again passed through the thrashing-machine, it consisting in a novel construction, combination, and arrangement of mechanism for such purposes, as will be more fully explained hereinafter.

Figure 1 is a sectional elevation, showing portions of a thrashing-machine, with my improved separator attached thereto. Fig. 2 is a plan view of the separator, showing the carrying-belt, the screens, the box or chamber in which the tailings are deposited, and the rakes which return said tailings to the thrashing-cylinder. Fig. 3 is a sectional elevation on line $x\ x$ of Fig. 2, showing one of the rakes for returning the tailings to the thrashing-cylinder, and the method of operating them. Fig. 4 is a sectional elevation on line $y\ y$ of Fig. 2, showing the devices for tilting the conveyer or endless belt, so as to discharge the tailings into the boxes in which the rakes operate. Fig. 5 is an elevation of a portion of the trough in which the conveyer or endless belt moves, showing how the same may be folded up when not in use.

Corresponding letters denote corresponding parts in the several figures.

In constructing devices for thrashing and cleaning grain, I use any approved form of thrashing mechanism, an outline of one form of which is shown at A, B, and C, in Fig. 1, the office of which is to convey the unthrashed grain to the machine, thrash the same, convey away the straw, and separate the fully-thrashed grain therefrom, and conduct the tailings, cockle, cheat-grass, and other small seeds to the separator.

In separators designed for the purposes for which this is used, as they have heretofore been constructed, the tailings have been allowed to pass out upon the side of the machine and into elevators, by which they have been carried up over the top thereof, and down upon the top of the unthrashed grain as it was being fed to the thrashing-cylinder. This method of returning that portion of the tailings which it is necessary to rethrash to the thrashing-cylinder is objectionable, because it makes the machine cumbersome, the elevators and their operating mechanism being in the way of persons operating the machine; and further, because it delivers the material upon the top of the unthrashed grain, by which it is frequently, and to a considerable extent, thrown away from its proper position and upon the ground or floor. My improvement is designed to remedy these and other objections, by providing a mechanism for conveying the tailings from a point at or near the center of the under side of the machine to the apron upon which the unthrashed grain is placed, and delivering them underneath such grain, as a consequence of which they are carried directly to the thrashing-cylinder, and are effectually prevented from being scattered or wasted by the feeding of the grain to the machine.

In constructing devices for the purpose above alluded to, in accordance with my improved plan, I attach to the under side of the thrashing-machine a box or trough, D, which I prefer to locate centrally with reference to the width of the machine. To the rear end of this box journal-boxes are secured, which carry a shaft, $A^1$, upon which two pulleys or a drum, $A^2$, are placed, and also a pulley, $A^3$, the latter being for the reception of a belt, which passes over a pulley on some part of the machine, which is capable of giving motion to the carrying and separating mechanism, as shown. Upon the pulleys $A^1$ endless belts E E are placed, which extend therefrom to and around pulleys upon a shaft, F, located upon the opposite or front end of the box D. To these belts cleats E' are attached, at such intervals as may be necessary, to convey the material through the box, and deliver it into receptacles G G, which are formed upon the sides of the box D at its front end. Upon the outer ends of shaft F, cranks H, or disks with crank-pins in them, are placed for the purpose of giving motion to rakes or feeders I, the outer ends of which are attached to said crank-pins. Their toothed portions work in the receptacles G G, and their inner ends through apertures formed in the feed-apron B. These parts are arranged as shown, in order that, as the tailings are brought to the front end of the machine by the endless belts E E, and delivered into the receptacles G G, they shall have their direction reversed, and be carried in an opposite one for a short distance, and then up through the apron, and be delivered thereupon, and under the unthrashed grain which may be in process of being fed to the thrashing-cylinder. The interior surfaces of the receptacles G G are of the inclined form shown in Fig. 4, in order that the falling of the material into the paths of the rakes or feeders shall be insured, and in order that all of the material brought to the front end of the box D may be deposited in the receptacles G G. And, to prevent the liability of the tailings being carried past such receptacles, and thus thrown out upon the floor, the pins I' I' are inserted in the inner surfaces of the rake-arms I I, as shown in Fig. 4, they being arranged in such a manner that when said arms are raised by the action of the crank-pins they shall come successively in contact with the under surfaces of the belts E E, and raise them up so as to discharge from them any substances that may be resting thereon. At a point about midway of the box D, or at any other convenient point, there is placed in its under surface a screen, K, the meshes of which are to be of such dimensions as to admit of the passage through them of cheat, cockle, seeds of grass, and weeds, and any small substances which it is not desirable to convey to the thrashing-cylinder, and, in order that the screen may be kept clean, the cleats upon the endless belt are made to come in contact with both its upper and under surfaces in passing it, as is shown in Fig. 1. A spring, K', is placed above said belts, at or near where the screen is located, in order that the tailings may not get under the belts and raise them up away from the screen. The box D has at its rear end a section, D', as shown in Figs. 1 and 5, it being for the purpose of enabling it to be swung up when the machine is not in use. This hinged section is provided with a screen, L, the openings in which are to be of such dimensions as to allow such portions of the tailings as are to be rethrashed, and such as are to be separated therefrom by the screen K, to pass through them, but such as to deposit any sticks or other large substances in the rear of the machine, a hopper, M, being provided for the purpose of conducting the tailings to such screen, as shown in Fig. 1.

What I claim as my invention, and desire to secure by Letters Patent, is—

1. The apron B, upon which the unthrashed grain is placed preparatory to being fed to the thrashing-cylinder, when constructed with an aperture or with apertures through it for feeding the tailings to the upper surface thereof, and to the under surface of the unthrashed grain, substantially as and for the purpose set forth.

2. In combination with openings through the apron B and trough D, and a carrier for transferring the tailings to the receptacle G, the rake-arms I for passing the tailings from said receptacle, through the aperture or apertures in the apron B, to the upper surface thereof, below the unthrashed grain, substantially as set forth.

3. The combination of the conveying-box D, receptacles G G, rakes I I, cranks H H, and shaft F, the parts being arranged to operate substantially as and for the purpose specified.

4. The combination of the swinging section D' of the conveying-box with the fixed portion, and the screen L, substantially as and for the purpose set forth.

5. The arrangement of the endless belts and their cleats with reference to the screen K, both above and below, so as to operate upon both sides of the screen, whereby said screen is kept clean, substantially as described.

In testimony whereof I have signed my name to this specification in the presence of two subscribing witnesses.

DANIEL GEISER.

Witnesses:
D. B. RUSSELL,
JNO. B. RUSSELL.